(12) United States Patent
Lim et al.

(10) Patent No.: US 6,344,428 B1
(45) Date of Patent: Feb. 5, 2002

(54) METHOD OF FORMING CATALYST LAYER FOR FUEL CELL

(75) Inventors: Chan Lim; Hyuk Chang, both of Seongnam (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/258,802

(22) Filed: Feb. 26, 1999

(30) Foreign Application Priority Data

May 4, 1998 (KR) .......................................... 98-15991
Dec. 29, 1998 (KR) .......................................... 98-60009

(51) Int. Cl.⁷ ............................................. H01M 4/88
(52) U.S. Cl. ..................................... 502/101; 427/115
(58) Field of Search ............................. 429/27, 40–43; 427/115; 502/101

(56) References Cited

U.S. PATENT DOCUMENTS 5,211,984 A   5/1993  Wilson
5,998,057 A * 12/1999  Koschany et al.

FOREIGN PATENT DOCUMENTS

WO         97/20359     * 6/1997

OTHER PUBLICATIONS

G. Gebel, et al. "Swelling Study of Perfluorosulphonated Ionomer Membranes", Polymer, 1993, vol. 34, No. 2, pp. 333–339 (No month available).

Timothy L. Croley et al., "Ionomer Applications in Coating Technology", Proceedings of the Nineteenth Water–Borne, Higher–Solids, and Powder Coatings Symposium, Feb. 26–28, 1992, p 596–608.

* cited by examiner

Primary Examiner—Stephen Kalafut
Assistant Examiner—Susy Tsang
(74) Attorney, Agent, or Firm—Burns, Doane, Swecker & Mathis, L.L.P.

(57) ABSTRACT

A method for preparing a slurry for forming a catalyst layer of a PEM fuel cell electrode and a method for fabricating the PEM fuel cell produced thereby are provided. The method for preparing a slurry for forming a catalyst layer of a proton exchange membrane (PEM) fuel cell according to the present invention comprises the steps of (a) adding an MOH solution to a perfluorosulfonate ionomer (PFSI) solution to convert PFSI in the PFSI solution into an $M^+$ form-PFSI solution, wherein M is an alkaline metal selected from the group consisting of Li, Na and K; (b) adding an organic polar solvent having a higher boiling point than that of alcohol remaining in the PFSI solution to a mixed solution obtained in step (a) and heating the mixture at a temperature range of the boiling point of the alcohol to 20° C. higher than the boiling point to remove the remaining alcohol to obtain a pretreated PFSI solution; and (c) mixing the pretreated PFSI solution with Pt/C to form a slurry for forming a catalyst layer of a PEM fuel cell. Since processing stability is improved and the slurry can be easily prepared, Pt loading greater than a conventional level can be achieved by a single coating step by preventing a Pt catalyst from penetrating into a backing layer, the electrode characteristics are improved. Also, mass production of the PEM fuel cells is possible.

13 Claims, 4 Drawing Sheets

METHOD OF FORMING CATALYST LAYER FOR FUEL CELL

This application claims priority under 35 U.S.C. §§119 and/or 365 to Korean Patent Applications No. 98-15991 filed May 4, 1998, and No. 98-60009 filed Dec. 29, 1998; the entire contents of which are hereby incorporated by reference.

BACKGROUND OF THE INVENTION

1. Field of the Invention

The present invention relates to a proton exchange membrane (PEM) fuel cell, and more particularly, to a method for preparing a slurry for forming a catalyst layer of a PEM fuel cell electrode having an improved processing stability and power output characteristics, a method for fabricating membrane/electrode assembly (MEA) for the PEM fuel cell and a PEM fuel cell produced by the MEA fabricating method.

2. Description of the Related Art

A proton exchange membrane (PEM) fuel cell is a potential clean energy source which can replace fossil fuels and has a high current density and energy conversion capability. Also, the PEM fuel cell is operable at room temperature and can be miniaturized and hermetically fabricated, and thus are widely applicable in such fields as pollution-free automobile industry, home-use power generation systems, mobile communications equipments, medical devices, military equipments, aerospace equipments and the like.

A PEM fuel cell is a power generation system for producing direct current electricity by an electrochemical reaction between hydrogen and oxygen, and the basic structure thereof is shown in FIG. 1. In FIG. 1, a general PEM fuel cell is constructed such that a proton exchange membrane 13 is interposed between an anode 11 and a cathode 12. A PEM 13 is 50 to 200 μm thick and is formed of a solid polymer electrolyte. In the PEM fuel cell, the anode 11 and the cathode 12 both have a backing layer (not shown) for supplying fuel gases and a catalyst layer where oxidation/reduction reaction of gaseous fuels takes place.

The oxidation/reduction reactions taking place at the PEM fuel cell are represented by the Equations (1) and (2).

That is to say, the oxidation reaction as represented by the Equation (1) takes place at the anode 11 of the gas diffusion electrode so that hydrogen molecules are converted into protons and electrons. The protons are transferred to the cathode 12 via the PEM 13. At the cathode 12, the reduction reaction as represented by the Equation (2) takes place, so that oxygen molecules receive electrons to be converted into oxygen ions, which are then reacted with protons produced from the anode 11 to then be converted into water molecules.

$$2H_2 \rightarrow 4H^+ + 4e^- \quad \text{[Equation 1]}$$

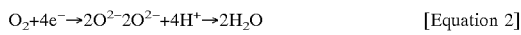

$$O_2 + 4e^- \rightarrow 2O^{2-} 2O^{2-} + 4H^+ \rightarrow 2H_2O \quad \text{[Equation 2]}$$

The catalyst layer is formed on a backing layer in the gas diffusion electrode of the PEM fuel cell. The backing layer is formed of a carbon cloth or a carbon paper and its surface is treated with polytetrafluorethylene (PTFE) so that reactant gases and water transferred to the PEM and generated from the above reaction can easily penetrate therethrough.

The catalyst layer is typically formed of platinized carbon powder (Pt/C). Here, carbon serves to extend the reaction site of introduced fuels, and platinum acts as a catalyst in the oxidation/reduction reaction of the gaseous reactants, that is, hydrogen and oxygen.

Since the PEM fuel cell uses a solid polymer as an electrolyte, the boundary between the electrode and the electrolyte is two-dimensional, which reduces the catalyst utilizing efficiency, compared to a liquid electrolyte. Thus, it is necessary to make a three-dimensional boundary between the electrode and the electrolyte.

Conventionally, in order to prepare a catalyst layer of the gas diffusion electrode, powdered Pt/C is used as a main component and PTFE is used as a binder. Here, since the oxidation/reduction reaction of a gaseous fuel in the presence of a catalyst occurs only at the boundary between the electrode and the electrolyte, the catalyst utilizing efficiency is very low. Thus, to obtain a current density of a practical level, a catalytic loading amount must be increased to about 4 mg/cm². However, in this case, due to high costs, the thus-formed electrode is used only for special purposes.

To overcome the above problems, as described in U.S. Pat. No. 4,876,115, for the purpose of limiting catalyst loadings to less than 0.50 mg/cm², a solution containing a proton conducting material selected from perfluorocarbon polymer commercially available from E.I. DuPont under the trademark Nafion® and ruthenium dioxide is coated on the electrode once or twice to form a single or double layer formed of the proton conducting material. However, in the PTFE-bonded electrode mainly for use in a phosphoric acid type fuel cells, a large amount of a binder such as PTFE, e.g., over 30 wt %, must be used in order to prevent phosphoric acid used as a liquid electrolyte from penerating into the electrode. Thus, Pt in the catalyst layer may be covered by PTFE, which lowers the catalyst utilizing efficiency. Also, since a sufficient catalyst loading cannot be attained by performing coating only once, the coating step must be repeated twice as described above.

Also, U.S. Pat. No. 5,234,777 discloses a method for preparing a proton exchange membrane comprising the steps of preparing an ink-form of a mixture containing Na⁺ form-PFSI polymer by mixing Pt/C and perfluorosulfonate ionomer (PFSI) and adding sodium hydroxide solution thereto, forming a thin film by directly coating the mixture on the surface of a solid polymer electrolyte or on a plate-shaped releasable substrate, transferring the thin film to the surface of the solid polymer electrolyte by a hot pressing method and curing the same. However, this method requires a pre-treatment process for converting the solid polymer electrolyte as the PEM into a Na⁺ form before performing the coating step. Also, a protonating step for converting a Na⁺-form PFSI electrode/Na⁺-form solid polymer electrolyte membrane composite film into a protonated PFSI must be performed after performing the coating and curing steps. Therefore, the process is complicated and the processing time is long.

The Nafion solution commercially available from E. I. DuPont contains a large amount of alcohol having low specific gravity as well as a perfluorocarbon polymer as a main component and analogs thereof. Thus, in the course of fabricating a PEM fuel cell, a large amount of an alcohol solvent exists in the mixture for forming a catalyst layer having a predetermined Nafion polymer content, and easily penetrates into an electrode substrate.

Therefore, a considerable amount of a Pt catalyst penetrates into an electrode support so that it cannot take part in an electrochemical reaction, thereby lowering the Pt catalyst utilizing efficiency. Also, the viscosity of the catalyst layer composition prepared by the conventional method is less than 100 cp (centipoise). It is difficult to maintain a predetermined viscosity during the step of coating the catalyst layer composition onto the electrode support. Also, it is not possible to adopt a continuous production system using a tape casting.

A technology suitable for resolving such problems has not been developed as of yet.

SUMMARY OF THE INVENTION

To solve the above problems, it is an objective of the present invention to provide a method for preparing a slurry for forming a catalyst layer for a proton exchange membrane (PEM) fuel cell electrode with no problem arising due to alcohol remaining in the slurry.

It is another objective of the present invention to provide a method for fabricating a PEM fuel cell having a Pt loading in an electrode higher than 0.2 mg/cm$^2$ by performing coating only once and capable of easily forming a catalyst layer directly on an electrode support to thus simplify the preparation process thereof, by using the slurry for forming a catalyst layer for a PEM fuel cell.

It is still another objective of the present invention to provide a PEM fuel cell prepared by the method.

Accordingly, to achieve the first objective, there is provided a method for preparing a slurry for forming a catalyst layer of a proton exchange membrane (PEM) fuel cell comprising the steps of:

(a) adding an MOH solution to a perfluorosulfonate ionomer (PFSI) solution to convert PFSI in the PFSI solution into an M$^+$ form-PFSI solution, wherein M is an alkaline metal selected from the group consisting of Li, Na and K;

(b) adding an organic polar solvent having a higher boiling point than that of alcohol remaining in the PFSI solution to a mixed solution obtained in step (a) and heating the mixture at a temperature range of the boiling point of the alcohol to 20° C. higher than the boiling point to remove the remaining alcohol to obtain a pretreated PFSI solution; and (c) mixing the pretreated PFSI solution with Pt/C to form a slurry for forming a catalyst layer of a PEM fuel cell.

To achieve the second objective, there is provided a method for fabricating a proton exchange membrane (PEM) fuel cell comprising the steps of:

(a) adding an MOH solution to a perfluorosulfonate ionomer (PFSI) solution to convert PFSI in the PFSI solution into an M$^+$ form-PFSI solution, wherein M is an alkaline metal selected from the group consisting of Li, Na and K;

(b) adding an organic polar solvent having a higher boiling point than that of alcohol remaining in the PFSI solution to a mixed solution obtained in step (a) and heating the mixture at a temperature range of the boiling point of the alcohol to 20° C. higher than the boiling point to remove the remaining alcohol to obtain a pretreated PFSI solution;

(c) mixing the pretreated PFSI solution with Pt/C to form a slurry for forming a catalyst layer of a PEM fuel cell;

(d) coating the slurry on one side of an electrode backing layer;

(e) drying the resultant material obtained in step (d) at a temperature less than or equal to a boiling point of the organic polar solvent, impregnating in an acid solution, washing and drying the resultant to form a gas diffusion electrode having a catalyst layer deposited on the electrode backing layer; and (f) interposing a PEM between an anode side and a cathode side of the gas diffusion electrode to then hot-press the same.

To achieve the third objective, there is proviede a PEM fuel cell fabricated by the above method.

The principles of the present invention lie in modifying conventionally used perfluorocarbon polymer by adding an organic solvent thereto, thereby solving a problem arising due to alcohol remaining on the polymer, improving processing performance by facilitating preparation of a high viscosity slurry and improving power characteristics of the PEM fuel cell, in fabricating anodic and cathodic electrochemical catalyst layers of the PEM fuel cell. Also, according to the present invention, before forming a MEA structure, the M$^+$ form-PFSI in the catalyst layer is protonated in a gas diffusion electrode state in which the catalyst layer is deposited on the backing layer, thereby shortening the overall processing time due to a reduced protonation time, compared to the conventional thin film forming method.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE INVENTION

Figure 1:
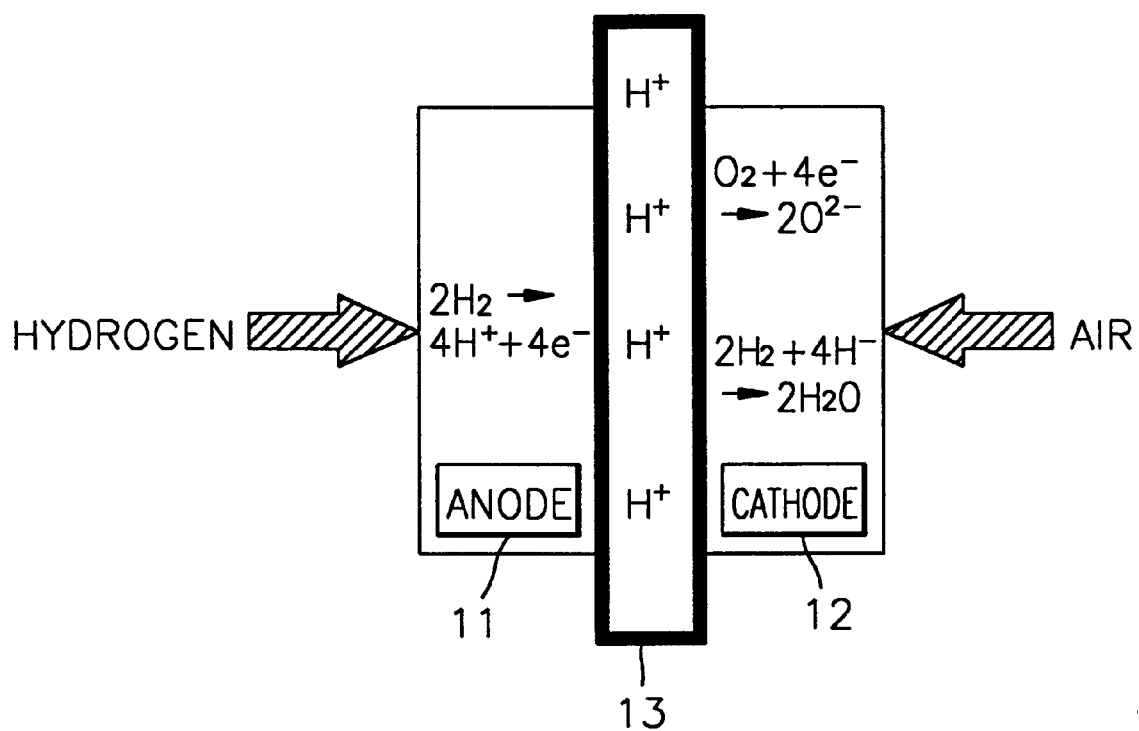
FIG. 1 is a cross section of a general PEM fuel cell.

The present invention is directed to a method for preparing a slurry for forming a catalyst layer for a PEM fuel cell electrode, wherein the method comprises the steps of:

(a) adding an MOH solution to a perfluorosulfonate ionomer (PFSI) solution to convert PFSI in the PFSI solution into an M$^+$ form-PFSI solution, wherein M is an alkaline metal selected from the group consisting of Li, Na and K;

(b) adding an organic polar solvent having a higher boiling point than that of alcohol remaining in the PFSI solution to a mixed solution obtained in step (a) and heating the mixture at a temperature range of the boiling point of the alcohol to 20° C. higher than the boiling point to remove the remaining alcohol to obtain a pretreated PFSI solution; and (c) mixing the pretreated PFSI solution with Pt/C to form a slurry for forming a catalyst layer of a PEM fuel cell.

The organic polar solvent in the step (b) is not specifically restricted, only if the its boiling point is higher than that of the remaining alcohol in the PFSI solution. The preferred example of the organic polar solvent includes dimethyl sulfoxide, N,N-dimethyl formamide and ethylene glycol.

According to the slurry forming method of the present invention, remaining alcohol in a PFSI solution is removed and replaced with an organic polar solvent, which results in a highly viscous slurry for a catalyst layer. Further, the organic polar solvent can not penetrate into a waterproof electrode support, so that the viscosity of the slurry is constantly maintained during coating, which enables continuous preparation process by a tape casting method.

Another aspect of the present invention is directed to a method for fabricating a proton exchange membrane (PEM) fuel cell, wherein the method comprises the steps of:

(a) adding an MOH solution to a perfluorosulfonate ionomer (PFSI) solution to convert PFSI in the PFSI solution into an $M^+$ form-PFSI solution, wherein M is an alkaline metal selected from the group consisting of Li, Na and K;

(b) adding an organic polar solvent having a higher boiling point than that of alcohol remaining in the PFSI solution to a mixed solution obtained in step (a) and heating the mixture at a temperature range of the boiling point of the alcohol to 20° C. higher than the boiling point to remove the remaining alcohol to obtain a pretreated PFSI solution;

(c) mixing the pretreated PFSI solution with Pt/C to form a slurry for forming a catalyst layer of a PEM fuel cell;

(d) coating the slurry on one side of an electrode backing layer;

(e) drying the resultant material obtained in step (d) at a temperature less than or equal to a boiling point of the organic polar solvent, impregnating in an acid solution, washing and drying the resultant to form a gas diffusion electrode having a catalyst layer deposited on the electrode backing layer; and (f) interposing a PEM between an anode side and a cathode side of the gas diffusion electrode to then hot-press the same.

The organic polar solvent in step (b) may be selected from the group consisting of dimethyl sulfoxide, N,N-dimethyl formamide and ethylene glycol.

Preferably, the amount of the organic polar solvent added is in the range of 80–98% by weight based on the total weight of the pretreated PFSI solution obtained in step (b).

The amount of the pretreated PFSI solution added in step (c) is preferably controlled such that the content of the PFSI polymer is in the range of 15–35% by weight based on the total solid weight of the slurry for forming the catalyst layer.

In step (c), the slurry for the catalyst layer is formed by Pt/C and the pretreated PFSI solution obtained in step (b) without using PTFE which is conventionally used as a binder, which prevents the phenomenon that the catalyst utilizing efficiency is decreased by the Pt/C catalyst of which the surface is covered with PTFE.

The slurry obtained in step (c) has a viscosity of 1000 cp or more, which is advantageous in adopting a tape casting method as the coating method in step (d).

The electrode backing layer in step (c) may be either waterproof carbon paper or carbon cloth.

The coating method in step (d) includes a doctor blade method, a spray method, a screen printing method and a brushing method.

The acidic solution in step (e) is not specifically restricted but any solution serving to allow the catalyst layer in the electrode to have proton conductivity can be adopted. Preferably, the concentration of the acidic solution is 1 mole or less.

The hot-pressing in step (f) is performed in the range of 100–135° C.

The present invention also includes a PEM fuel cell fabricated by the above method.

In accordance with the method of the present invention, in fabricating an electrochemical catalyst layer of an anode and cathode of a PEM fuel cell, a conventional perfluorocarbon polymer containing solution (ex: PFSI solution) can be used. A problem caused by an alcohol remaining in the solution can be modified by adding an organic polar solvent. By such a modification of the PFSI solution, a problem caused by alcohol remaining in the non-modified PFSI solution is solved, and a highly viscous slurry can be easily prepared, thereby improving processing performance and power output characteristics of the PEM fuel cell. Further, before forming a MEA structure, the $M^+$ form-PFSI in the catalyst layer is protonated in a gas diffusion electrode state in which the catalyst layer is deposited on the backing layer, thereby shortening the overall processing time due to a reduced protonation time, compared to the conventional method in which protonation is performed after forming a MEA structure.

Hereinafter, a method for preparing a PEM fuel cell according to the present invention will be described in more detail.

Figure 2:
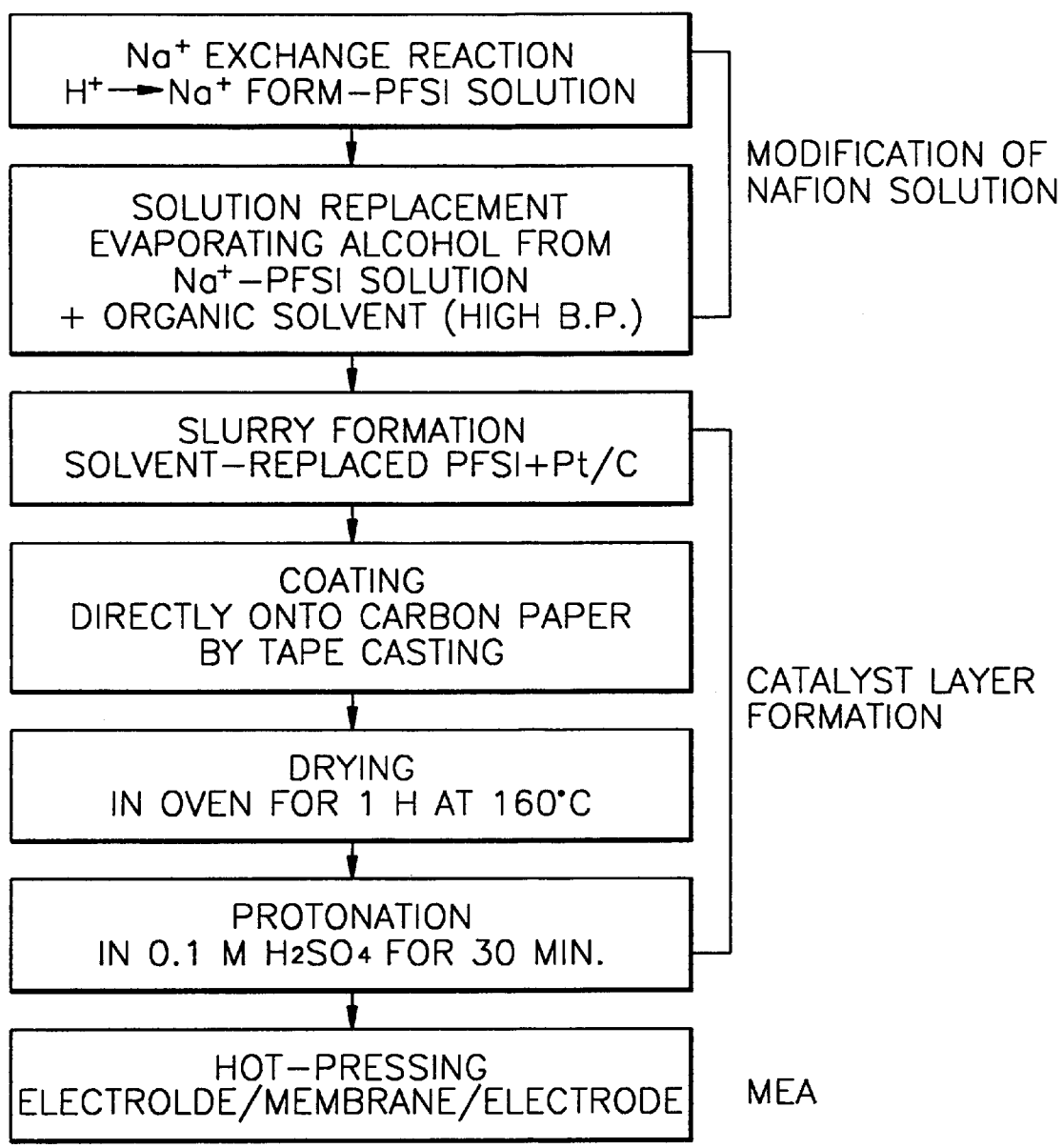
FIG. 2 shows a sequence of steps of preparing a PEM fuel cell according to an embodiment of the present invention.

FIG. 2 shows a sequence of steps of preparing a PEM fuel cell according to an embodiment of the present invention First, sodium hydroxide (NaOH) solution is added to PFSI solution typically used as a perfluorocarbon polymer in the same equivalent ratio and mixed to convert PFSI in the solution into a Na+ form.

Here, instead of NaOH, lithium hydroxide (LiOH) or potassium hydroxide (KOH) may be used to convert the PFSI into Li+ or K+ form. The concentration of the commercially available PFSI solution is generally 5% by weight and the remaining components of the solution includes a mixture of water and alcohol.

The alcohol impedes formation of a viscous slurry for coating of a catalyst layer of the electrode and generates harmful gases.

An organic polar solvent having a higher boiling point than that of the alcohol remaining in the PFSI solution is added to the above mixed solution and heated to a temperature range of the boiling point of the alcohol to 200 C higher than the boiling point to remove the remaining alcohol and to form pretreated PFSI solution. Here, the added amount of the PFSI solution is preferably controlled such that the content of the organic polar solvent is in the range of 80 to 98% by weight based on the pretreated PFSI solution.

As the organic polar solvent, at least one solvent selected from the group consisting of dimethyl sulfoxide, N,N-dimethyl formamide and ethylene glycol is used. The remaining alcohol components are removed using such an organic solvent, thereby improving processing stability and easily preparing a slurry having a high viscosity. Subsequently, Pt/C is added to the pretreated PFSI solution and mixed. Here, the added amount of the pretreated PFSI solution is controlled such that the content of the PFSI polymer is in the range of 15 to 35% by weight based on the total solid weight of the slurry for forming a catalyst layer, thereby forming a slurry. The viscosity of the slurry is greater than 1000 cp (centipoise). Then, the slurry mixture is coated on one side of a backing layer to form a gas diffusion electrode.

As the backing layer, a material typically used as a backing layer of an electrode in a PEM fuel cell, e.g., wet-proof carbon paper or teflonized carbon loaded carbon cloth, is used. As the coating method, a doctor blade method, a spray method, a screen printing method or a brushing method may be employed. Then, the resultant material is dried at a temperature lower than a boiling point of the organic polar solvent, impregnated in an acidic solution, cleaned and dried to form gas diffusion electrodes, that is, an anode and a cathode, having a catalyst layer deposited on the backing layer. The treatment with the acidic solution is for endowing the catalyst layer with hydrogen ion conductivity and any compound suitable for this purpose can be used. Finally, a PEM is interposed between the anode and the cathode and hot pressing is performed on the resultant structure at a temperature of 100 to 135° C., thereby completing the PEM fuel cell having the PEM between gas diffusion electrodes.

According to the present invention, a Pt loading in the catalyst layer of the electrode greater than 0.2 mg/cm$^2$ can be achieved by performing coating once. Also, since the PFSI replaced by a less volatile organic solvent is used, harmful gases are hardly generated and the viscous slurry can be easily prepared. Further, since protonation is performed in the gas diffusion electrode state in which the catalyst layer is deposited on the backing layer, the processing time is shorter than that in the conventional art in which protonation is performed after forming the electrode/electrolyte assembly.

Now, the present invention will be described in more detail with reference to a preferred embodiment but the invention is not limited thereto.

EXAMPLE

To 10 g of a perfluorosulfonate solution (5% by weight, Aldrich Chemical Company, Inc), aqueous NaOH solution was added in the same equivalent ratio and stirred at room temperature for one night to convert the PFSI in the solution to a Na+form. 9.5 g of ethylene glycol was added to the thus-mixed solution and heated in an oven or an oil bath at approximately 85° C. for 12 hours to remove alcohol components remaining in the mixed solution. Pt/C (20% Pt by weight, available from E-Tek Inc. under the trademark of Vulcan XC72R) was mixed in a weight ratio of 1:2, based on the weight of the PFSI in the mixed solution, and uniformly mixed using a mixer such as a ball mill to obtain a mixture in the form of a slurry. Here, the viscosity of the slurry was 3000 cp.

The slurry mixture was coated on the backing layer using a carbon paper available from E-Tek Inc., which was waterproofed with 20 wt % tetrafluoroethylene-hexafluoropropylene copolymer available from E.I. DuPont under the trademark of Teflon 120 as an electrode backing layer. The slurry-coated electrode was placed into an oven and dried for about 1 hour. Here, the Pt loading was about 0.2 mg/cm$^2$.

Subsequently, in order to endow the electrode catalyst layer with hydrogen ion conductivity, the electrode catalyst layer was immersed in 0.1 M H$_2$SO$_4$ solution maintained at a temperature of about 60° C. to be protonated. In order to remove the remaining acidic solution, the resultant electrode was cleaned using distilled water and dried in an oven maintained at about 85° C. for 10 minutes, thereby completing a coating step for forming the electrode catalyst layer.

The PEM (Nafion 117 available from E.I. DuPont) and the electrode were cut for an effective reaction area of the electrode to be 5×5 cm$^2$ and then the electrodes and the PEM were deposited such that the electrode catalyst layer faces the PEM to obtain an electrode/PEM/electrode structure, which was then hot-pressed at 125° C. for 3 minutes, thereby fabricating an MEA. The MEA was mounted on a single cell, the cell was heated at 75° C. and hydrogen/oxygen or air are heated at 95° C./90° C. to be supplied to the cell, with the pressure being maintained at atmospheric pressure. Here, hydrogen and oxygen were supplied to the cell in humidified states.

Figure 3:
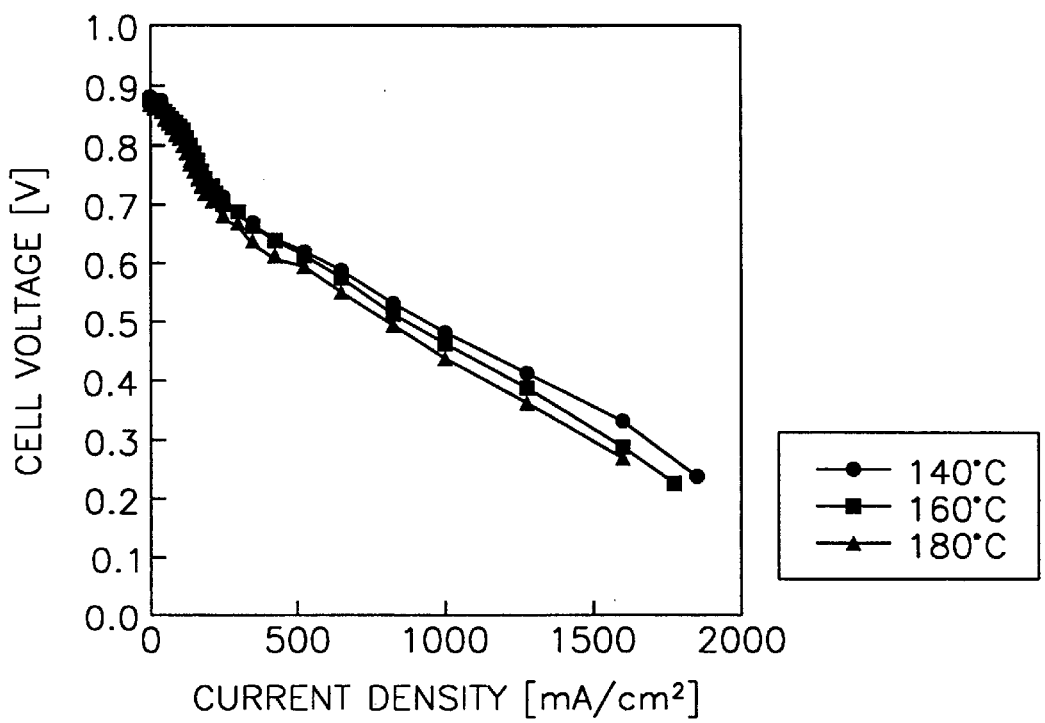
FIG. 3 graphically depicts power output characteristics depending on the drying temperature of a slurry coated on a gas diffusion electrode of a PEM fuel cell according to one example of the present invention.

FIG. 3 shows the result of power output characteristics of a membrane electrode assembly (MEA) fabricated while varying drying temperatures after coating the catalyst layer on the backing layer. As shown in FIG. 3, power output characteristics are maintained at a preferable range at drying temperatures in the range of 140–180° C. which is defined as a preferable drying temperature range in the above.

Figure 4:
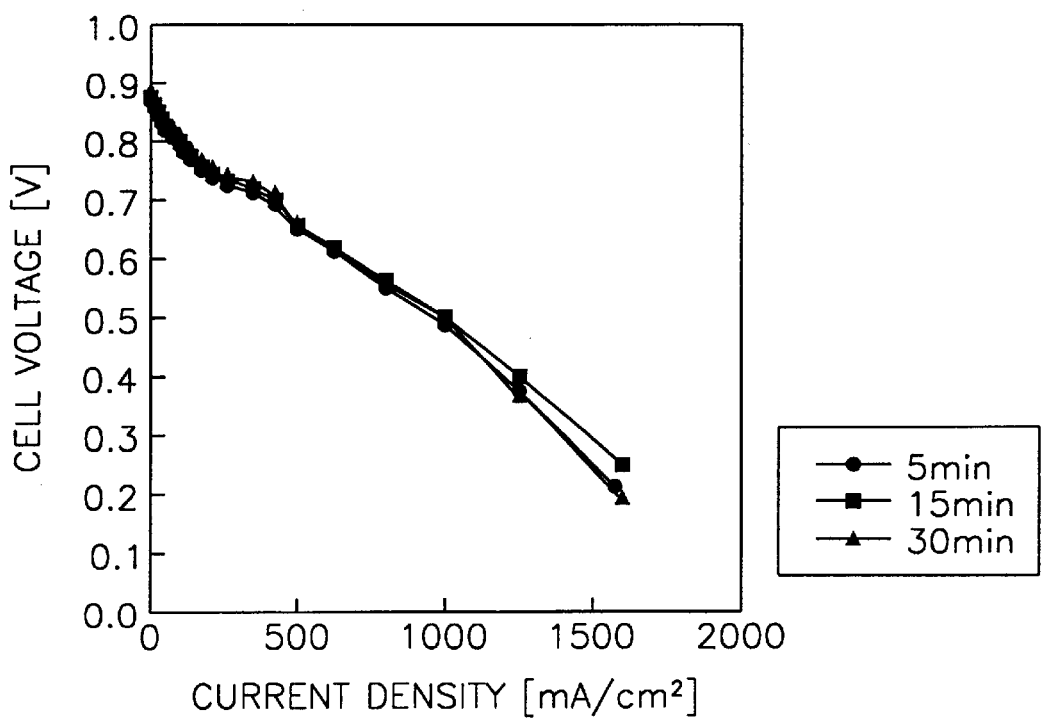
FIG. 4 graphically depicts power output characteristics depending on the protonation time of a catalyst layer coated on a gas diffusion electrode of a PEM fuel cell according to one example of the present invention.

FIG. 4 shows power output characteristics of the MEA fabricated while varying the treatment time in a 0.1 M H$_2$SO$_4$ solution in the electrode/catalyst layer state before depositing the PEM, in order to investigate an appropriate protonation time. As shown in FIG. 4, in the present invention, protonation is performed in the gas diffusion electrode state so that the Nafion polymer in the electrode catalyst layer can be sufficiently protonated for a relatively short time, i.e., 5–30 minutes, unlike the conventional protonation time of the electrode/electrolyte assembly, which is at least 1 hour.

Figure 5:
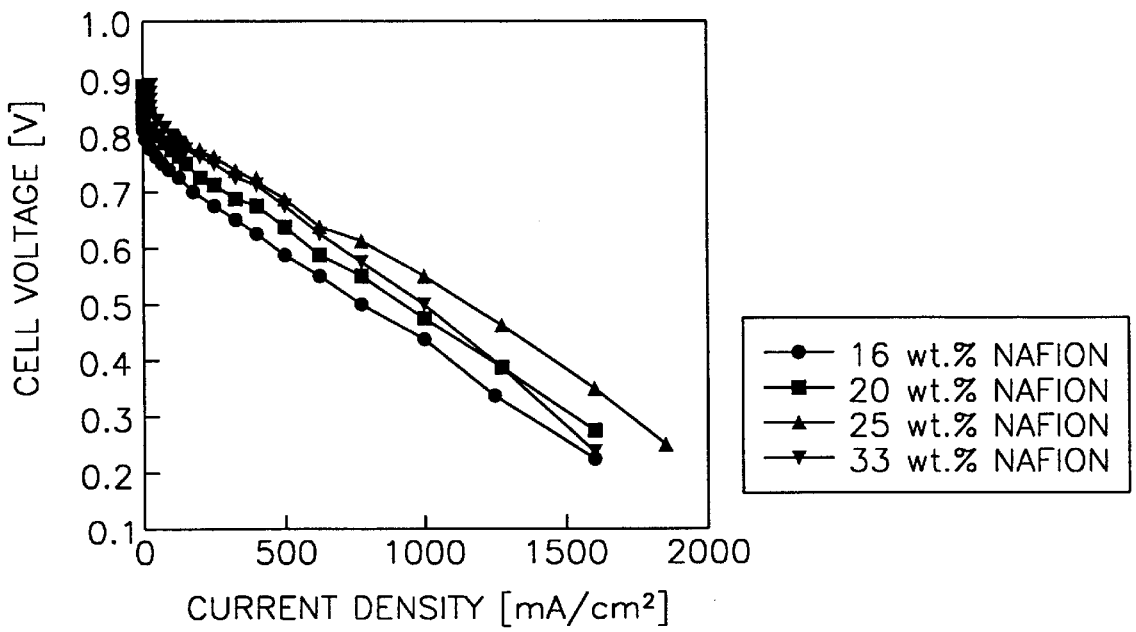
FIG. 5 graphically depicts power output characteristics depending on the content of Nafion (PFSI) contained in the catalyst layer of a PEM fuel cell of the present invention.

FIG. 5 graphically depicts power output characteristics depending on the content of Nafion (PFSI) contained in the catalyst layer of the PEM fuel cell according to the example. FIG. 5 shows that power output characteristics are preferable when the content of Nafion contained in the catalyst layer is 15–35 wt %, particularly 25 wt %.

Figure 6:
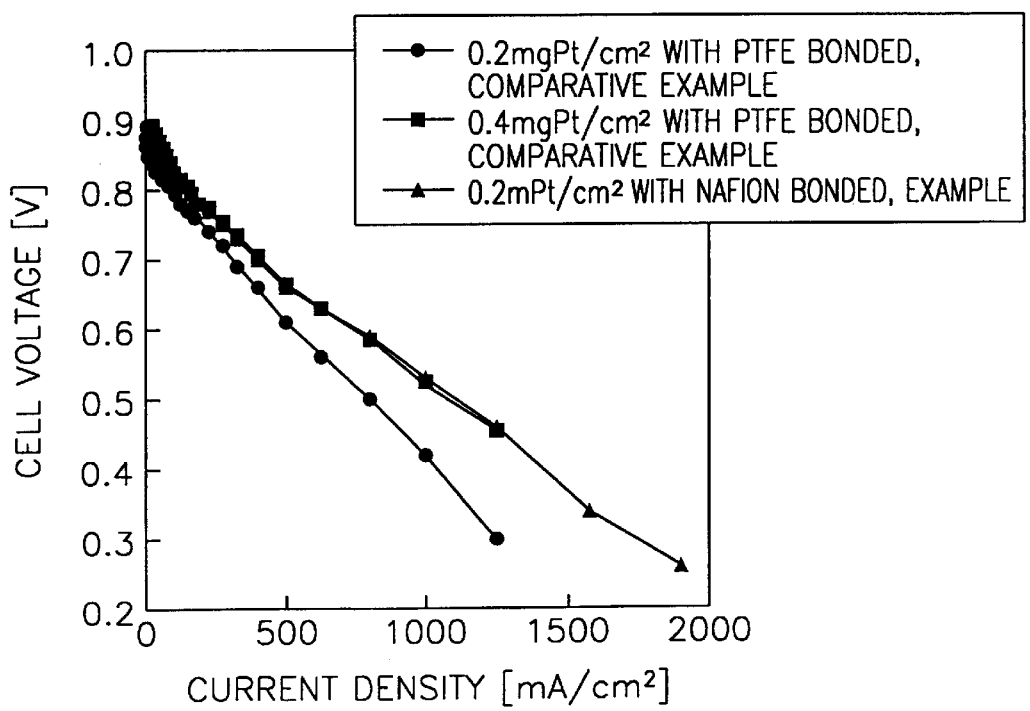
FIG. 6 graphically depicts Pt loadings and power output characteristics depending on the Pt loadings in a PEM fuel cell prepared by the method according to one example of the present invention and conventional method.

FIG. 6 graphically depicts Pt loadings and power output characteristics depending on the Pt loadings in a PEM fuel cell prepared by the method according to the example and conventional method, that is, the case when Nafion is used as a binder in forming PEM fuel cell electrode (the example of the present invention) and the case when the conventional PTFE is used as a binder in forming PEM fuel cell electrode (comparative example).

Comparative Example 8 cc of a petroleum-series organic solvent (available from Shell Oil Company under the trademark of Shell Sol) as a dispersion agent was added to 1 g of Pt/C (available from E-Tek Dynamics, Inc. under the trademark of Vulcan XC72R) in which 20 wt % of Pt particles are coated on carbon black, and then ball milling was performed to obtain a uniform mixture. Subsequently, based on the total solid weight of the slurry of the catalyst layer (that is, the total weight of the catalyst to be formed after drying), 15 wt % of a PTFE dispersion was added to the uniform mixture and mixed. Then, 1.5 g of dibutyl phthalate and 1.5 g of corn oil were sequentially added to the resultant mixture and mixed to prepare a slurry.

The slurry was coated on a carbon paper (TGPH 090, Toray) and tape-casted using a doctor blade, and then dried in a vacuum oven at 220° C. for 30 minutes. Then, the resultant material was sintered at 370° C. for 30 minutes, to fabricate the gas diffusion electrode having the catalyst layer coated on the backing layer. Subsequently, 5 wt % of Nafion polymer electrolytic liquid (available from Aldrichi Chemical Inc. under the trademark of Nafion) was coated on the surface of the catalyst layer of the gas diffusion electrode. This is for forming a continuous Nafion film on the Pt catalyst by impregnating the Nafion polymer electrolytic liquid on the surface at which it is assembled with the PEM for the purpose of forming a three-dimensional interface between the Pt catalyst and the Nafion polymer electrolytic liquid. Then, the electrode catalyst layer was superimposed over both sides of the Nafion 117 PEM and hot-pressed at 130° C. at a pressure of about 80 atm, thereby fabricating a catalyst/PEM/catalyst assembly. Subsequently, a backing layer was coupled to both sides of the assembly, thereby completing a unit cell of the PEM fuel cell. Here, as the backing layer, waterproofed carbon paper was used.

The power output characteristics of the thus-fabricated PEM fuel cell were measured and the results are shown in FIG. 6, in which 0.2 mg/cm$^2$ and 0.4 mg/cm$^2$ of Pt were used.

It can be understood from FIG. 6 that even with half the Pt loading, the power output characteristics according to the present invention (the above example) were the same as those according to the conventional method.

As described above, according to the present invention, a less volatile organic polar solvent is added to a proton conducting polymer containing solution as a component of a catalyst layer to completely remove alcohol components remaining in the solution, thereby maintaining a constant viscosity of a slurry during an electrode coating step. Thus, a continuous production process is possible by tape casting. Also, since a constant level of a Pt loading can be achieved by a single coating step by preventing a Pt catalyst from penetrating into an electrode support, the electrode characteristics are improved.

What is claimed is:

1. A method for preparing a slurry for forming a catalyst layer of a proton exchange membrane (PEM) fuel cell comprising the steps of:
   (a) adding an MOH solution to a perfluorosulfonate ionomer (PFSI) solution containing an alcohol to convert PFSI in the PFSI solution into an M$^+$ form-PFSI solution, wherein M is an alkali metal selected from the group consisting of Li, Na and K;
   (b) adding an organic polar solvent having a higher boiling point than that of the alcohol remaining in the PFSI solution to the M$^+$ form-PFSI solution obtained in step (a) and heating the mixture at a temperature range from the boiling point of the alcohol to 20° C. higher than the boiling point of the alcohol to remove the remaining alcohol to obtain a pretreated PFSI solution; and
   (c) mixing the pretreated PFSI solution with Pt/C to form a slurry for forming a catalyst layer of a PEM fuel cell.

2. The method according to claim 1, wherein the organic polar solvent in step (b) is selected from the group consisting of dimethyl sulfoxide, N,N-dimethyl formamide and ethylene glycol.

3. The method according to claim 1, wherein the amount of the organic polar solvent added is in the range of 80–98% by weight based on the total weight of the pretreated PFSI solution obtained in step (b).

4. The method according to claim 1, wherein the viscosity of the slurry obtained in step (c) is greater than 1000 cp (centipoise).

5. A method for fabricating a proton exchange membrane (PEM) fuel cell comprising the steps of:
   (a) adding an MOH solution to a perfluorosulfonate ionomer (PFSI) solution containing an alcohol to convert PFSI in the PFSI solution into an M$^+$ form-PFSI solution, wherein M is an alkali metal selected from the group consisting of Li, Na and K;
   (b) adding an organic polar solvent having a higher boiling point than that of the alcohol remaining in the PFSI solution to the M$^+$ form-PFSI solution obtained in step (a) and heating the mixture at a temperature range from the boiling point of the alcohol to 20° C. higher than the boiling point of the alcohol to remove the remaining alcohol to obtain a pretreated PFSI solution;
   (c) mixing the pretreated PFSI solution with Pt/C to form a slurry for forming a catalyst layer of a PEM fuel cell;
   (d) coating the slurry on one side of an electrode backing layer;
   (e) drying the coated resultant material obtained in step (d) at a temperature less than or equal to a boiling point of the organic polar solvent, impregnating the dried resultant material in an acid solution, washing and drying the impregnated resultant material to form a gas diffusion electrode having a catalyst layer deposited on the electrode backing layer; and
   (f) interposing a PEM between an anode side of a first gas diffusion electrode formed from steps (a) through (e), and a cathode side of a second gas diffusion electrode formed from steps (a) through (e), to then hot-press the same.

6. The method according to claim 5, wherein the organic polar solvent in step (b) is selected from the group consisting of dimethyl sulfoxide, N,N-dimethyl formamide and ethylene glycol.

7. The method according to claim 5, wherein the amount of the organic polar solvent added is in the range of 80–98% by weight based on the total weight of the pretreated PFSI solution obtained in step (b).

8. The method according to claim 5, wherein the viscosity of the slurry obtained in step (c) is greater than 1000 cp (centipoise).

9. The method according to claim 5, wherein the amount of the pretreated PFSI solution added in step (c) is controlled such that the content of the PFSI polymer is in the range of 15–35% by weight based on the total solid weight of the slurry for forming the catalyst layer.

10. The method according to claim 5, wherein the electrode backing layer in step (d) is either wet-proof carbon paper or teflonized carbon loaded carbon cloth.

11. The method according to claim 5, wherein the coating performed in step (d) includes a doctor blade method, a spray method, a screen printing method or a brushing method.

12. The method according to claim 5, wherein the drying temperature in step (e) is in the range of 140–180° C.

13. The method according to claim 5, wherein the hot-pressing in step (f) is performed in the range of 100–135° C.

* * * * *